Aug. 31, 1965 W. F. ICELAND 3,204,081
SEAM FOLLOWER WITH ARC SCANNING
Filed Nov. 16, 1962 2 Sheets-Sheet 1

INVENTOR
W. F. ICELAND
BY John W. Gaines
ATTORNEY

United States Patent Office 3,204,081
Patented Aug. 31, 1965

3,204,081
SEAM FOLLOWER WITH ARC SCANNING
William F. Iceland, Metuchen, N.J., assignor to Air Reduction Company, Incorporated, New York, N.Y., a corporation of New York
Filed Nov. 16, 1962, Ser. No. 238,186
20 Claims. (Cl. 219—125)

This invention relates to seam followers or seam tracking apparatus and more particularly to the use of an ionized stream such as an electric arc, plasma arc, electron beam, or the like as the tracking agent, which may also be the working device, as for example in a welding operation.

Tracking apparatus of a type in which a sensing device is necessarily located some distance from the arc or working device, as at a point ahead thereof, has the disadvantage that the lead distance between the sensing element and the working device or tool hinders the tracking mechanism from executing sharp turns, unless satisfactory delay means can be added between the sensing element and the tool to offset the dead distance. The need for such delay means is a complication which it is desirable to avoid. Photoelectric tracking devices fall into this category, as well as other electromagnetic devices which employ a beam or field other than the arc, beam, or torch flame itself. Photoelectric tracking systems for following a seam in metal may require special lighting effects to distinguish the seam from the adjacent metal surfaces, thus adding to the amount of apparatus required to achieve the desired result. Among other known tracking devices, some are not adapted to follow the actual seam or crack unless a template, pattern or line chart is first prepared.

Tracking apparatus of a type in which the working arc, beam or stream serves also as a probe in the sensing system, on the other hand, such as hitherto have been proposed, have had various disadvantages, such as requiring in addition the sensing of an electrical condition in the workpiece.

It is an object of the present invention to reduce the complexity of a tracking system by sensing variations solely in the electrical condition of the ionized stream itself without necessity to sense the condition of the workpiece.

Another object is to improve the sensitivity of a tracking system.

Another object is to render the tracking system insensitive to variations in the arc length.

Tracking systems of the type in which an electric or plasma welding arc, electron beam or the like serves as the combined tracking agent and sensing device are open to the further objection that the response of the sensing device varies in amplitude as a function of the length of the arc.

It is an object of the present invention to obtain a signal from the arc or beam which will have a characteristic property that does not depend upon the length of the arc or beam.

It is a feature of the invention that the signal from the arc or beam has a second characteristic which does depend upon the length of the arc and which may be used to generate an alternating current signal for automatic control of the arc length, if desired, without detriment to the functioning of the device as a seam tracker. Hitherto, as far as I am aware, error signals used for control of arc length have not been alternating in nature but have been direct current signals. Because of the alternating nature of my control signals, alternating current amplification of the signals is facilitated.

Another feature of the invention is that the error or correction signal is substantially unaffected by parts of the welding machine or by fixtures for holding the workpiece in place, being affected almost solely by the material of the workpiece in the immediate vicinity of the seam.

Other features, objects and advantages will appear from the following more detailed description of illustrative embodiments of the invention, which will now be given in conjunction with the accompanying drawings.

Figure 1:
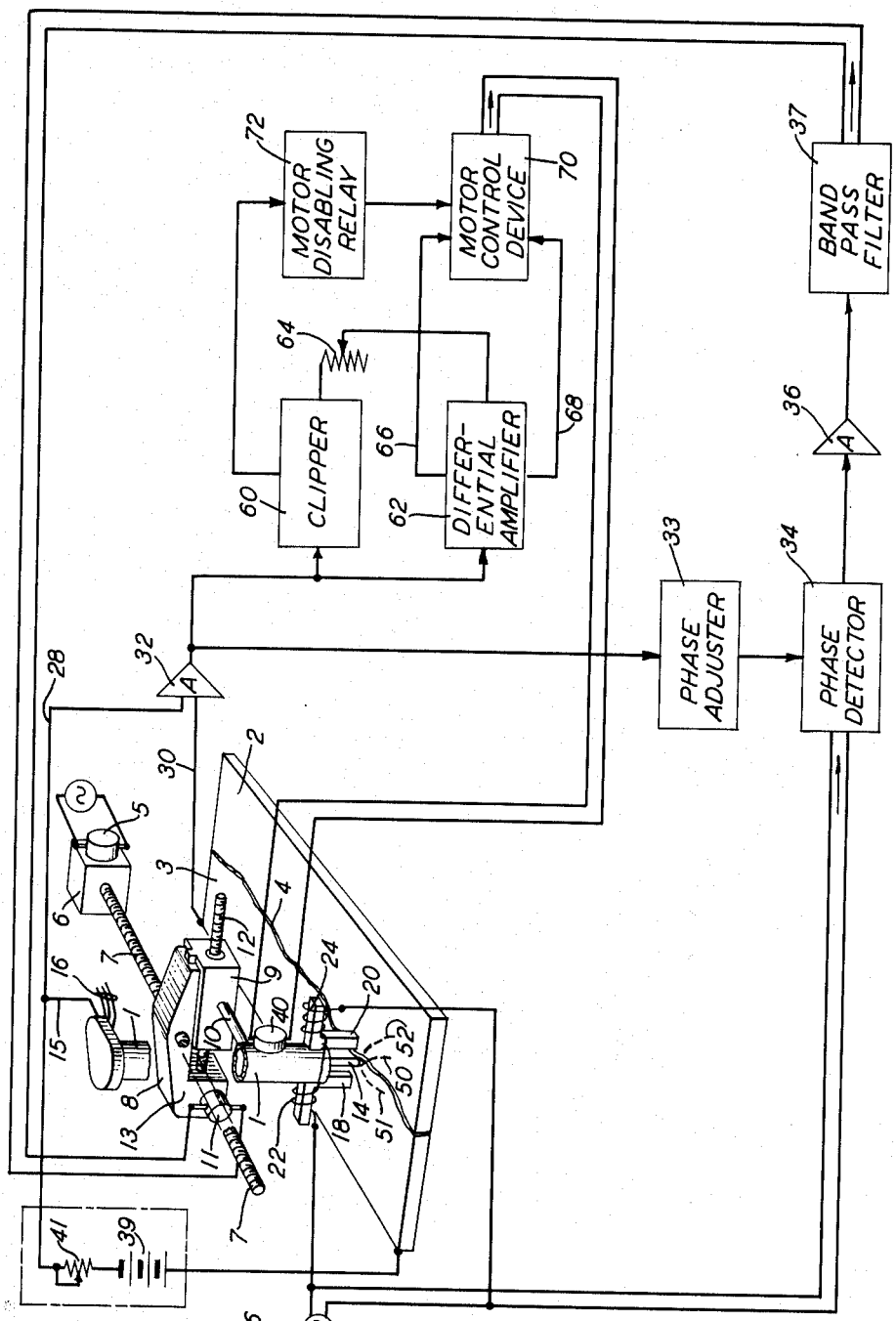
FIG. 1 is a combination of a perspective view, partly broken away, and a schematic diagram, showing an illustrative embodiment of the invention.

As shown in FIG. 1, a welding torch 1 is mounted to traverse a workpiece comprising work parts 2 and 3 to be joined along a seam 4, which seam while extending generally in a given direction is assumed to be crooked to a considerable degree. For propelling the torch 1 in the general direction of the seam 4, there is provided a motor 5 connected through gearing in a casing 6 to a lead screw 7 which extends generally in the direction of the seam 4. This lead screw 7 imparts motion to a carrier 8 which acts as a support for a slide 9 on which the torch 1 is mounted by a bracket 10. The slide 9 is movable crosswise of the seam 4 relative to the carrier 8 by a reversible motor 11 which imparts rotation to a cross-adjusting screw 12 with which it is connected through gearing in a casing 13 which may be integral with the carrier 8 or attached thereto. The cross-adjusting screw 12 makes a threaded engagement with the slide 9. The arrangement is such that rotation of motor 11 in either direction will adjust slide 9 relatively to its carrier 8 to position the torch 1 laterally of the seam 4 as it is traversed lengthwise thereof by the motor 5 acting through its gear transmission in casing 6 and lead screw 7 which engages and drives carrier 8. The motor 5 is connected, as indicated, to a source of power supply by means of which its speed and direction of rotation are controlled to traverse the torch 1 along the seam 4. It is of course understood that the parts of the machine just described are suitably supported relatively to one another and to the workpiece by other members of the machine which for clarity of illustration have not been shown. Also the workparts 2 and 3 may be held in assembled relationship in a clamp or clamps forming part of the machine or forming part of a jig which may be positioned in the machine, or the machine may be positioned on or over the workparts which are otherwise assembled as by tack welding at spaced positions along the seam.

Any suitable welding agency with either a consumable or a non-consumable electrode may be employed. I have illustrated an inert gas shielded electric arc welding torch which may have the construction illustrated and described in United States Letters Patent 2,512,705, Nelson E. Anderson and George R. Turbett, granted June 27, 1950 and entitled Fluid-Cooled Gas-Blanketed Arc Welding Torch, which uses a non-consumable electrode. Welding current is supplied to the electrode 14 of this torch through a welding cable 15 preferably from a low ripple power source to minimize interference between power ripples and control signals, represented in the drawing as a battery 39 and a series resistor 41. Cooling fluid and inert shielding gas are supplied through hoses 16.

The welding torch 1 is normally centered over the seam 4 under the control of a signal producing means which is connected across the arc. This signal producing means is sensitive to changes in the electrical condition of the arc.

In addition to motion imparted to the arc by the motor 11, the arc is vibrated back and forth across the seam 4 by means of pole pieces 18 and 20 located near the electrode 14 and energized by windings 22 and 24 respectively, which are supplied from any suitable alternating current source, represented in the drawing by a generator or oscillator 26, which may for example be an ordinary power source of 60 cycles per second. Alternatively, the electrode 14 may be vibrated by suitable mechanical means instead of electromagnetically displacing the arc alone.

The sensing circuit is connected effectively across the arc by means of a conductor 28 from the welding cable 15 and a conductor 30 from the workpiece, which lead to the input of an amplifier 32. Alternatively, the conductor 28 may be connected directly to the electrode 14. An output connection from the amplifier 32 is made through a phase adjustor 33 to the input of a phase detector 34 which is supplied with a reference carrier frequency wave preferably from the same source 26 used to energize the vibrator windings 22, 24. The output from the phase detector 34 may be adjusted so that it is negligibly small when the probing beam is off to either side of the seam 4. In this condition, due to the phase adjustor 33, the signal applied to the phase detector 34 by the amplifier 32 may be made to be out of phase with the reference carrier wave applied to the phase detector by the source 26 so that there is substantially no output from the detector. When the probing beam crosses the seam, I find that the signal passing through the amplifier 32 suddenly reverses its phase during the crossing. During this brief interval, the signal applied to the phase detector by the amplifier is at least partially in phase with the reference carrier wave, causing an output pulse to be generated in the phase detector.

As long as the excursions of the probing beam are symmetrical on the two sides of the seam, the pulses generated in the phase detector 34 occur at uniform time intervals, two pulses for each complete cycle of the source 26. For example, if the source 26 operates at 60 cycles per second the pulses occur at the rate of 120 pulses per second. The pulses are amplified in an amplifier 36 and impressed upon a band pass filter 37 having a relatively narrow pass band centered, in the case illustrated, at 60 cycles per second and having a relatively high attenuation for pulses occuring at twice that rate, i.e. at 120 pulses per second.

When the excursions of the probing beam are unsymmetrical with respect to the seam, two successive pulses generated in the phase detector 34 occur relatively close together followed by a longer interval. In the extreme case, two pulses occur almost simultaneously, followed by a long interval almost equal to one complete cycle of the source 26.

FIG. 1 includes a showing in diagrammatical form of the effect of dissymmetry in the relationship of the tip 14 and the seam 4, for the case where the electrode 14 is off the seam 4 to the side represented by workpart 2. The center line of the arc is represented at 50 in central position and superimposed at 51 and 52; the center line of the arc is also represented at the extreme positions of its excursion due to its vibratory motion. It will be noted that as the arc moves from the central position 50 to the extreme position 51 over workpart 3 and back to the central position, the arc makes two successive crossings of the seam 4 within les sthan a half cycle of the period of the vibratory motion of the arc. On the other hand, as the arc moves from the central position 50 to the extreme position 52 over workpart 2 and back to the central position, the arc does not cross the seam at all, from which it is seen that there are two seam crossings relatively close together in time, followed by a relatively longer time interval. It will be understood that the area of the workpiece covered by the arc will at all times be sufficient to cover the seam. To clarify the diagram, the showings of the extreme positions of the center of the arc at 51 and 52 somewhat exaggerate the extent of the excursions of the arc during scanning.

Figure 2:
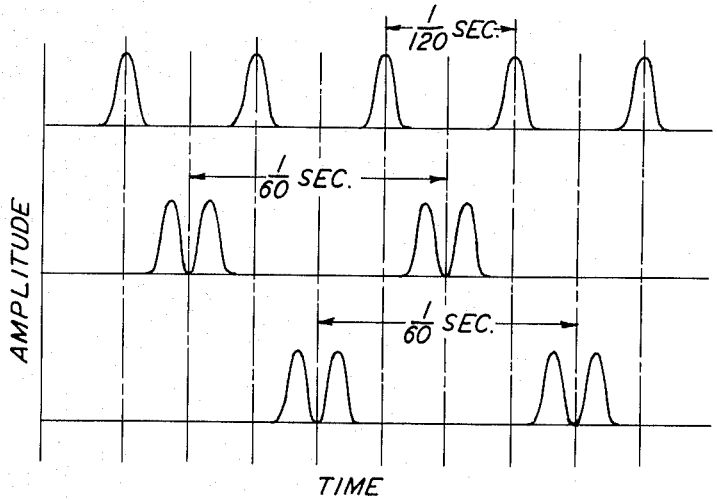
FIG. 2 is a set of graphs useful in explaining the operation of the system of the invention.

FIG. 2 shows three graphs on the same time scale, the top graph representing for a 60 cycle per second scanning frequency the case when the arc is centered over the seam. The pulse train consists of pulses occurring regularly each one-hundred-twentieth of a second. The middle graph represents the case when the arc is centered off to one side of the seam. The pulses come close together in pairs separated by intervals of approximately a sixtieth of a second. The pair of pulses is centered about a point midway between two pulses of the upper graph, and represents one phase of the sixty cycle per second component generated by the scanning motion. The lower graph represents the case when the arc is centered off to the opposite side of the seam from what it is for the middle graph. The phase of the sixty cycle per second component generated in this case is opposite to the phase of the sixty cycle per second component shown in the middle graph.

The effect of this dissymmetry is to make the pulse train resemble more and more closely a train of pulses occurring at the rate of 60 pulses per second, the resemblance increasing as the excursions become more and more unsymmetrical with respect to the seam 4. Therefore, when the probing beam departs from a symmetrical relationship to the seam, the output of the phase detector develops a 60 cycle per second component which passes freely through the filter 37 and constitutes a signal wave which is impressed upon the motor 11 in proper phase to turn that motor in the direction to restore the symmetrical relationship between the probing beam and the seam, thus causing the welding tool to follow the seam. Not only does the 60 cycle component in the output of the phase detector 34 increase as the probing beam departs from a symmetrical relationship to the seam, but the phase of the 60 cycle per second pulse train has one of two opposite values depending upon which side of the seam the probing beam dwells for the longer portion of the cycle.

In known manner, the phase of the pulse train impressed upon the motor determines in which direction the motor will rotate. That is to say, the train of pulses can be applied as the input voltage, to one phase-coil of a two-phase induction motor, for example, whereas the other phase-coil of the motor is impressed with a reference or control voltage at a regular frequency. Hence, a rotating field will develop in the motor 11 whenever the probing beam starts to deviate from the seam 4. The connection of the filter 37 to the motor 11 may be made in the proper polarity to insure that the slide 9 will be moved in the direction to bring the probing beam back into the normal centered relationship to the seam 4.

Figure 3:
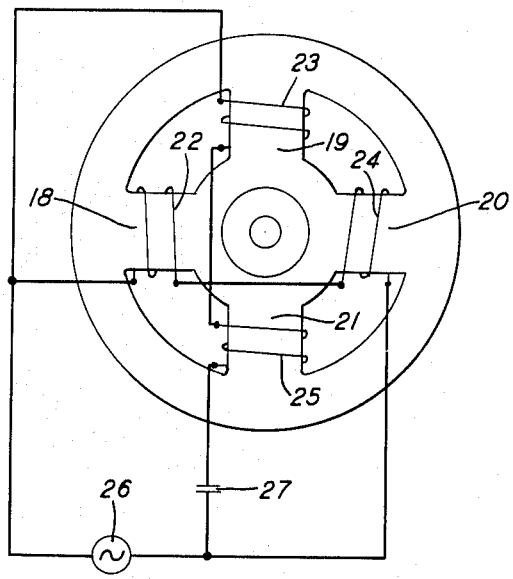
FIG. 3 is a schematic diagram of an alternative form of scanning means which may be substituted for the scanning means shown in FIG. 1.

FIG. 3 shows means for imparting a circular scanning motion to the ionic stream instead of a vibratory motion. Four pole pieces 18, 19, 20 and 21 are provided, symmetrically positioned with respect to the stream. The pole pieces 18 and 20 are provided with the in-phase windings 22, 24 as in FIG. 1, these windings being energized in phase agreement with the output wave from the source 26. The pole pieces 19 and 21 are provided with windings 23 and 25 which are energized in phase quadrature relation to the waves from the source 26 through a series capacitor 27 in known manner as in a split phase induction motor. The result is a rotating magnetic field acting upon the ionic stream and causing the stream to execute a rotary scanning motion. If desired, the single phase source 26 may be replaced by a two-phase source, in which case the capacitor 27 may be omitted. The spacing of the seam crossings in the case of the circular scanning motion will be similar to that described above in connection with the vibratory scanning motion illustrated in FIG. 1. Alternatively, the electrode 14 may be rotated by a suitable motor instead of rotating the arc alone.

The further feature of the invention that relates to the automatic control of arc length, which control may be effected simultaneously with the function of seam tracking, will now be described in conjunction with FIG. 1.

I find that the signals generated in the sensing circuit vary in amplitude with the length of the gap or spacing between the electrode 14 and the workpiece. In order to effect an automatic control upon this spacing, I pass a portion of the output from the amplifier 32 into a control circuit for adjusting the spacing, comprising a clipper 60, a differential amplifier 62, and associated devices as shown. The clipper 60 reduces the signal waves from the amplifier 32 to a uniform maximum amplitude in known manner, as long as these waves come in at amplitudes equal to or exceeding a predetermined value. This output from the clipper 60 is impressed upon the differential amplifier 62 along with signals directly from the amplifier 32 to serve as an amplitude comparison standard for the differential amplifier. The amplitude applied to the differential amplifier by the clipper is made adjustable by means of a rheostat 64. The amplitude so applied is made to fall in the midst of the range of amplitudes of the signals applied to the differential amplifier by the amplifier 32. The differential amplifier 62 has the usual two outputs, one of which, shown at 66, is actuated when the signals from the amplifier 32 exceed in amplitude the signals from the clipper 60, and the other, shown at 68, is actuated when the signals from the clipper 60 exceed in amplitude those from the amplifier 32.

The outputs from the differential amplifier 62 are connected to a motor control device 70 which provides energizing current of two polarities to a reversible motor 40 according to whether the output 66 or the output 68 is activated, to turn the motor 40, which operates upon any suitable means in the tool 1 for raising and lowering the electrode 14 with respect to the workparts 2 and 3. The energizing current furnished to the motor 40 may be made to have the proper polarity to insure that the electrode 14 will be moved in the direction to restore the spacing to its normal value. To prevent an erratic or runaway condition in case of any failure of the scanning apparatus to provide suitable control signals, a motor disabling relay 72 is provided which is actuated by an output connection from the clipper 60 and acts upon the motor control device 70 in such manner as to shut off the power supply to the motor 40 if the signals fed to the relay 72 by the clipper 60 fail entirely or fall below a predetermined minimum amplitude the relay 72 is brought into action to stop the motor 40.

With respect to all embodiments of the invention, it will be understood that the tip element 14 is not restricted to being an electrode of a welding arc, but may be an electrode of an electron beam device, or it may be the nozzle of a plasma welding torch. Such devices have the common characteristic utilized in the practice of this invention, namely that they serve as one terminal of an ionized discharge stream extending from the tip element 14 to the workpiece, the electrical characteristics of which discharge are affected in some degree by the electrical characteristics of the workpiece upon which the discharge stream terminates, particularly the electrical conductivity of the workpiece.

While in many instances I prefer to use the working ionized stream or arc as the probing agent, a separate ionized stream serving simply as a signal generating device for tracking may be used.

Furthermore, while the invention has been illustrated by an embodiment in which a seam or crack in the workpiece is to be tracked, the system may also be used to follow a line pattern of conductive ink or the like.

While illustrative forms of apparatus and methods in accordance with the invention have been described and shown herein, it will be understood that numerous changes may be made without departing from the general principles and scope of the invention.

What is claimed is:

1. In a seam tracking device, in combination, means for producing an ionized stream and for maintaining an electric current along at least a portion of the path of said stream, means to apply said stream to the surface of an electrically conductive workpiece having a seam therein to be followed, means to cause a repetitive scanning motion of said stream transversely of the seam, means to detect variations in said electric current in said stream as the stream crosses the seam, and means to utilize the detected variations to cause said repetitive scanning motion to be maintained substantially centered relatively to the seam.

2. In a seam tracking device, in combination, means for producing an ionized stream and for maintaining an electric current along at least a portion of the path of said stream, means to cause a periodic scanning motion of said ionized stream over the surface of a conductive workpiece transversely of a seam to be tracked, means to pick up an electromagnetic effect existing within said ionic stream, means to detect a variation in said electromagnetic effect each time said ionized stream crosses said seam, means to distinguish between equal and unequal time intervals between successive crossings, whereby an error signal is generated, and means controlled by said error signal for centering the said scanning motion of said ionized stream with respect to the seam.

3. In a seam tracking device, in combination, means for producing an ionized stream and for maintaining an electric current along at least a portion of the path of said stream, said stream being capable of performing a useful operation upon an electrically conductive workpiece, means to cause a periodic scanning motion of said ionized stream transversely of a seam to be tracked, means to pick up an electrical effect within said ionized stream, means to detect a variation in said electrical effect each time said ionized stream crosses said seam, means to distinguish between equal and unequal time intervals between successive crossings, whereby an error signal is generated, and means controlled by said error signal for centering the said scanning motion of said ionized stream with respect to the seam.

4. In a seam tracking device, in combination, a welding arc, means to cause said arc to execute a periodic scanning motion transversely of a seam to be tracked, means to detect a voltage across said arc, means to detect a change of said voltage when said arc crosses the seam, means to distinguish between equal and unequal time intervals between voltage changes due to successive crossings, whereby an error signal is generated, and means controlled by said error signal for centering the scanning motion of the arc with respect to the seam.

5. Apparatus according to claim 4, in which the said scanning motion is rotary.

6. Apparatus according to claim 4, in which the said scanning motion is vibratory.

7. In a seam tracking device, in combination, means for producing an ionized stream and for maintaining an electric current along at least a portion of the path of said stream, said stream being capable of performing a useful operation upon an electrically conductive workpiece, means to produce a vibratory motion of said stream over a region on the surface of the workpiece including a seam to be followed, means to detect a variation in said current which occurs at such times as the stream passes over the seam, whereby a pulse is generated, means to distinguish between equal and unequal time intervals between successive pulses so generated, whereby an error signal is generated, and means actuated by said error signal to maintain said vibratory motion substantially centered relatively to the seam.

8. Apparatus according to claim 7, in which the said source of an ionized stream is an electric arc.

9. In a seam tracking device, in combination, means for producing an ionized stream and for maintaining an electric current along at least a portion of the path of said stream, said stream being capable of performing a useful operation upon an electrically conductive workpiece, means to produce a uniform rotary motion of said stream over a region on the surface of the workpiece including a seam to be followed, means to detect a variation in said current which occurs as the stream crosses the seam, whereby a pulse is generated each time the stream crosses the seam, means to distinguish between equal and unequal time intervals between successive pulses, whereby an error signal is generated, and means controlled by said error signal for maintaining said rotary motion, substantially centered relatively to the seam.

10. Apparatus according to claim 9, in which the said source of an ionized stream is an electric arc.

11. Seam tracking apparatus for arc welding, comprising, in combination, an arc electrode means to move an arc from said electrode back and forth across the seam at a substantially uniform periodic rate, over successive excursions of substantially equal amplitude, means connected to the arc electrode to detect an electrical effect whenever the arc developed by said electrode crosses the seam, means to compare the time intervals between successive ones of the said detected crossing effects in order to detect a departure of the said crossing effects from recurrence at equal time intervals, and means actuated by said comparing means for centering the excursions of the arc with respect to the seam.

12. Apparatus for guiding a current carrying ionized stream device along a seam in a conductive workpiece, comprising, in combination, means to move the said stream back and forth across the seam at a substantially uniform periodic rate over successive excursions of substantially equal amplitude to apply a moving ionic discharge to the workpiece over a region spanning the seam, means to detect an electromagnetic variation in said discharge as the stream passes over the seam, phase responsive means connected to said detecting means for detecting a phase variation in the succession of the said electromagnetic variations, and means actuated by said phase responsive means for centering the excursions of the said stream with respect to the seam.

13. In a seam tracking device, in combination, a source of a current carrying ionized stream for performing a useful operation upon an electrically conductive workpiece, means to cause a periodic scanning motion of said ionized stream transversely of a seam to be tracked, whereby a pulse is generated each time said ionized stream crosses said seam, means to distinguish between equal and unequal time intervals between successive pulses, whereby a first error signal is generated, means controlled by said first error signal for centering the said scanning motion of said ionized stream with respect to the seam, means to move the workpiece in a direction generally along the seam, whereby variations in the surface of said workpiece cause variations in the length of the ionized stream, means to detect variations in the amplitude of the signals generated by said scanning motion whereby a second error signal is generated, and means controlled by said second error signal for maintaining the length of the ionized stream substantially constant despite said variations in the surface of the workpiece.

14. Apparatus according to claim 13, in which at least said second error signal is alternating in nature, and in which alternating current amplifying means are provided for amplifying said second error signal prior to controlling the length of the ionized stream.

15. Seam tracking apparatus for use in scanning-arc-type welding, wherein a welding electrode forms the source of the scanning arc: said apparatus comprising, in combination with the source of the said arc, means to move said arc to and fro across the seam at a substantially uniform periodic rate, over successive excursions of substantially equal amplitude, circuit means connected to the arc to communicate therefrom an electrical effect whenever the arc crosses the seam, detecting means connected to the circuit means to compare the time intervals between successive ones of said communicated crossing effects in order to detect a departure of the said crossing effects from a symmetrical condition of recurrence at equal time intervals, said condition indicative of a succession of equal amplitude excursions being executed, and error signal generating means responsive to said detecting means to generate one error signal as a function of an excursion having a comparatively larger amplitude and time interval occurring on one side of said seam, and another error signal as a function of an excursion having a comparatively larger amplitude and time interval occurring on another side of said seam, and means to utilize said error signals to center the motion of the arc with respect to the seam.

16. Apparatus according to claim 15, wherein said error signal generating means comprises a band pass filter having an amplified, narrow pass-band output, said apparatus further comprising two-phase induction motor means connected in the output of said error signal generating means effective to operate in one sense in response to one of said error signals and in another sense in response to the other of said error signals.

17. The method of seam tracking employing a current carrying ionized discharge stream, which method comprises the steps of causing the said stream to execute a repetitive scanning motion transversely of the seam to be tracked, detecting a succession of current variations as the stream repeatedly crosses the seam, and utilizing the detected variations to cause the said stream to maintain the said scanning motion substantially centered with respect to the seam.

18. The method of seam tracking employing a current carrying ionized discharge stream, which method comprises the steps of causing the said stream to execute a periodic scanning motion transversely of the seam to be tracked, detecting a variation of current in said stream each time the stream crosses the seam, detecting differences in the time intervals between said detected current variations to determine differences in the time intervals between successive seam crossings, and centering the said scanning motion with respect to the seam by means of said detected differences in time intervals.

19. The method of seam tracking employing a welding arc as a tracking device, which method comprises the steps of causing the arc to execute a periodic scanning motion transversely of the seam to be tracked, detecting a change of voltage across said arc when said arc crosses the seam, detecting differences in the time intervals between said detected current variations to determine differences in the time intervals between successive voltage changes, and centering the said scanning motion with respect to the seam by means of said detected differences in time intervals.

20. The method of seam tracking employing a current carrying ionized discharge stream, which method comprises the steps of causing the said stream to execute a periodic scanning motion transversely to the seam to be tracked, thereby generating a periodic signal, detecting a variation in said signal due to a change in the current of the said stream each time the stream crosses the seam, detecting differences in the lengths of time intervals between successive ones of said current variations to determine differences in time intervals between successive seam crossings, utilizing detected differences in the lengths of time intervals between successive seam crossings to cause the said stream to track the seam, detecting amplitude variations in said periodic signal due to changes in the length of the ionized stream, and utilizing variations in the amplitude of said periodic signal to maintain a substantially constant length of the said stream.

References Cited by the Examiner

UNITED STATES PATENTS

| | | |
|---|---|---|
| 2,919,370 | 12/59 | Giannini et al. |
| 2,921,261 | 1/60 | King et al. |
| 3,050,669 | 8/62 | Moseley et al. _____ 318—31 |
| 3,063,698 | 11/62 | Hancock. |

RICHARD M. WOOD, *Primary Examiner.*

JOSEPH V. TRUHE, *Examiner.*